United States Patent [19]

Nakazawa et al.

[11] 4,332,014
[45] May 25, 1982

[54] DATA RETRIEVAL SYSTEM

[75] Inventors: Tamotsu Nakazawa; Kenzo Ina, both of Yokohama; Takashi Minagawa, Tokyo, all of Japan

[73] Assignee: Canon Kabushiki Kaisha, Tokyo, Japan

[21] Appl. No.: 80,660

[22] Filed: Oct. 1, 1979

Related U.S. Application Data

[63] Continuation of Ser. No. 884,538, Mar. 8, 1978, abandoned.

[51] Int. Cl.³ .................................................. G06F 7/02
[52] U.S. Cl. ............................................................ 364/900
[58] Field of Search ... 364/200 MS File, 900 MS File

[56] References Cited

U.S. PATENT DOCUMENTS

| | | | |
|---|---|---|---|
| 3,024,989 | 3/1962 | Dapo et al. | 364/900 |
| 3,594,735 | 7/1971 | Furlong | 364/900 |
| 3,676,853 | 7/1972 | Terry | 364/900 |
| 3,794,981 | 2/1974 | O'Connor | 340/146.2 |
| 3,845,465 | 10/1974 | Hosick et al. | 340/146.2 |
| 3,848,586 | 11/1974 | Suzuki et al. | 340/146.2 |
| 3,931,612 | 1/1976 | Stevens et al. | 364/900 |

*Primary Examiner*—Gareth D. Shaw
*Attorney, Agent, or Firm*—Fitzpatrick, Cella, Harper & Scinto

[57] ABSTRACT

A data retrieval system with a keyboard for entering data retrieval conditions. The system includes a first memory for storing subject data to be searched, a second memory for storing data required for searching the subject data, a comparator unit capable of determining whether or not the selected data is greater than, less than or equal to a preset data, and third memory for storing retrieval conditions. The contents of the first, second and third memories is placed into the comparator unit in synchronism with each other.

2 Claims, 5 Drawing Figures

FIG. 1

→ READ-OUT DIRECTION

| | 1ST ITEM | 2ND ITEM | 3RD ITEM | 4TH ITEM | 5TH ITEM | n-TH ITEM |
|---|---|---|---|---|---|---|
| 1 SUBJECT DATA (D1) RECORD | | | | | | |
| 6 RETRIEVAL CONDITIONS (M1) | EQUAL F | RANGE F | NUL | EQUAL F | MAXIMUM F | |
| 4 KEYWORDS (R1) | KEY(1) | KEY(2) | | KEY(3) | KEY(4) | |
| 5 KEYWORDS (R2) | | KEY(2') | | | | |

FIG. 4

(SUBJECT DATA)

| | 1ST ITEM | 2ND ITEM | 3RD ITEM | 4TH ITEM | 5TH ITEM |
|---|---|---|---|---|---|
| | ARTICLES | PRICE | ARTICLE CODES | CLERK | AMOUNT STORED |
| A | TV SET | 143,000. | MA18-0001 | 01 | 250. → |
| B | RADIO SET | 25,700. | T011-1033 | 01 | 30. → |
| C | TV SET | 129,000. | MA14-0300 | 02 | 123. → |
| D | CASSETTE RECORDER-RADIO SET | 53,000. | VI33-4003 | 03 | 520. → |
| E | TV SET | 87,000. | NE11-2011 | 02 | 19. → |
| ... | --- | --- | --- | --- | --- |

FIG. 5

RETRIEVAL INFORMATION & CONDITIONS

| | 1ST ITEM | 2ND ITEM | 3RD ITEM | 4TH ITEM | 5TH ITEM |
|---|---|---|---|---|---|
| | EQUAL F | RANGE F | | EQUAL F | MAXIMUM F |
| 6 RETRIEVAL CONDITIONS | | | | | |
| 4 KEYWORDS R1 | TV SET | 100,000 | | 02 | 150. |
| 5 KEYWORDS R2 | | 150,000 | | | |

DATA RETRIEVAL SYSTEM

This is a continuation of application Ser. No. 884,538, filed Mar. 8, 1978, now abandoned.

BACKGROUND OF THE INVENTION

1. Field of the Invention

The present invention relates to a data retrieval or searching system capable of searching stored data for one or more items which comply with one or more specified retrieval conditions of requirements.

2. Description of the Prior Art

The conventional data retrieval systems may in general include a sequential file system in which keywords are sequentially arrayed for binary search, and a random file system in which keywords may be so converted as to permit the random access. In both systems, one or more items complying with one specified retrieval condition or requirement may be retrieved. Therefore indexes for respective items would be required for changing retrieval conditions or requirements. Furthermore it has been very difficult to retrieve one or more items complying with a combination (a logical combination) of retrieval conditions or requirements. Thus the cost of software required is high and the data retrieval speed is low.

SUMMARY OF THE INVENTION

One of the objects of the present invention is therefore to provide a data retrieval or searching system which substantially overcomes the above and other defects encountered in the conventional data retrieval systems, and which freely retrieves the data complying with specified retrieval conditions or requirements regardless of their combinations and number. The system will considerably improve the efficiency of memory equipment and hardware and ensure the highspeed, accurate and reliable data retrieval.

BRIEF DESCRIPTION OF THE DRAWINGS

FIG. 1 is a chart used for the explanation of the underlying principle of the present invention;

FIG. 4, including A-E, shows an example of data to be searched; and

FIG. 5 is a chart showing some specific retrieval nditions or requirements.

DESCRIPTION OF THE PREFERRED EMBODIMENT

Referring to FIG. 1, in synchronism with subject data D1 read out from a memory in the direction of the arrow, retrieval conditions M1 and keywords R1 and R2 are read out. In response to the contents of the retrieval conditions M1, the subject data D1 is compared with the keywords R1 and R2. The retrieval conditions M1 include some instructions which cause a comparator unit to execute specified comparisons, such as relational and range comparisons, as will be described in detail hereinafter, and codes each representing the end of each item in the subject data D1. The subject data D1 and the keywords R1 and R2 are processed in real time within a reading period of the subject data D1.

The retrieval conditions M1 are stored in a retrieval condition storage, and the instructions are given to the comparator unit from the storage so that the items in the subject data D1 may be continuously stored in a subject data storage. Furthermore the codes for separating the adjacent items are not needed. As a result, the efficiency of the subject data storage may be much improved. The retrieval conditions M1 may be arbitrarily changed with commands entered from an external keyboard so that the retrieval is accomplished with any type of keywords.

Figure 2:
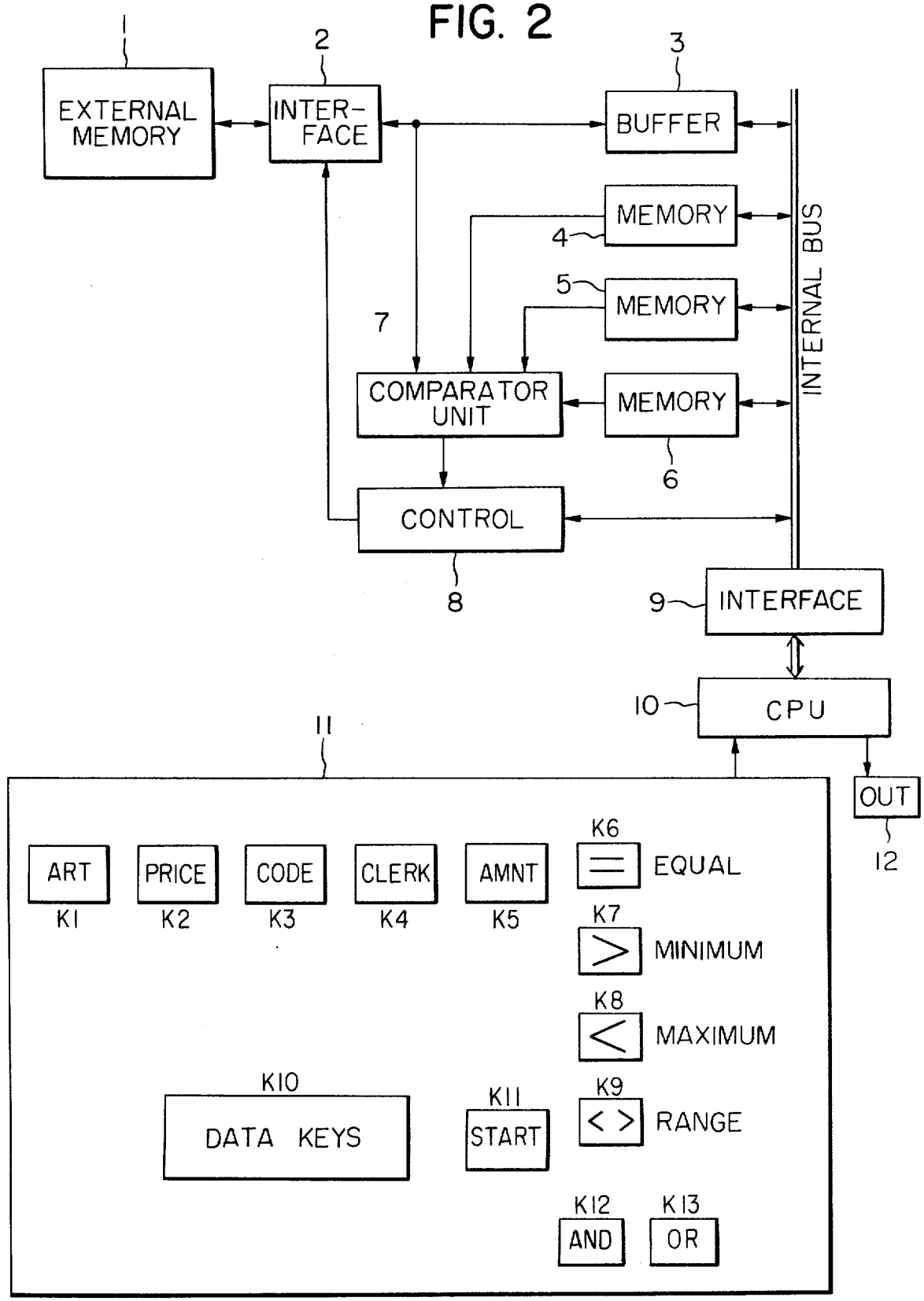
FIG. 2 is a schematic block diagram of a preferred embodiment of a data retrieval system in accordance with the present invention.

Referring to FIG. 2, reference numeral 1 denotes an external memory, such as a magnetic disk, for storing the subject data D1; 2, an interface circuit; 3 a buffer circuit; 4 and 5, memories where the parallel 4-bit keywords R1 and R2 are stored; 6, a memory for storing a 4-bit retrieval condition in parallel; 7, a comparator unit; 8, a control; 9, an interface circuit between the components 1 through 8 and a central processor unit 10; 11, a keyboard; and 12, an output unit such as a display or printer. Key data entered from keyboard 11 may be stored into the memories 4, 5 and 6. In response to the start instruction, the control 8 causes the contents of the external memory 1 to be transferred through the interface circuit 2 to the comparator unit 7. In synchronism with this operation, the memories 4 and 5 are caused to develop their contents R1 and R2 to the comparator unit 7 while the memory 6 is also caused to develop to the comparator unit 7 the comparison condition code as well as the code identifying the end of each item. The comparator unit 7 interprets the comparison condition code to perform the comparisons between the subject data D1 and the keywords R1 and R2 until the F code at the end of each item (See FIG. 1) is detected.

Next referring to FIGS. 1 and 3, the output circuitry of the retrieval condition storage 6 will be described. The retrieval condition codes or items (a group of the first item through the n-th item will be referred to as "one record" in this specification) as shown in FIG. 1 are stored in the storage 6 and are read out sequentially from the left. The first EQUAL code is pushed out from the storage 6 to pass through AND gate G2 and OR gate G4 to a decoder DC. The decoder DC interprets the EQUAL code to generate the EQUAL signal. When the first item of the subject data is processed, the parallel 4-bit F code representing the end of the item is derived from the storage 6 to be applied to AND gate G1. In response to the output from AND gate G1, AND gate G2 is disabled, and the contents of a delay element F1 are transmitted through AND gate 3 and OR gate 4 to the decoder DC. Since the contents of the delay element F1 are the code derived from the storage prior to the F code, it seems that the EQUAL codes were continuously transmitted to the decoder DC from the storage 6 during the time interval of the first item. The F code is also transmitted to the control 8.

The RANGE code in the second item is transmitted to the decoder DC in the similar manner described above, and the decoder DC generates the RANGE signal in response to which the subject data D1 and the keywords R1 and R2 are compared.

Since the third item contains no code (NULL code), no output is derived from the decoder DC. As a result, no comparison is made until some retrieval condition is transmitted from the memory 6. The successive items are processed in a manner substantially similar to that described above.

Figure 3:
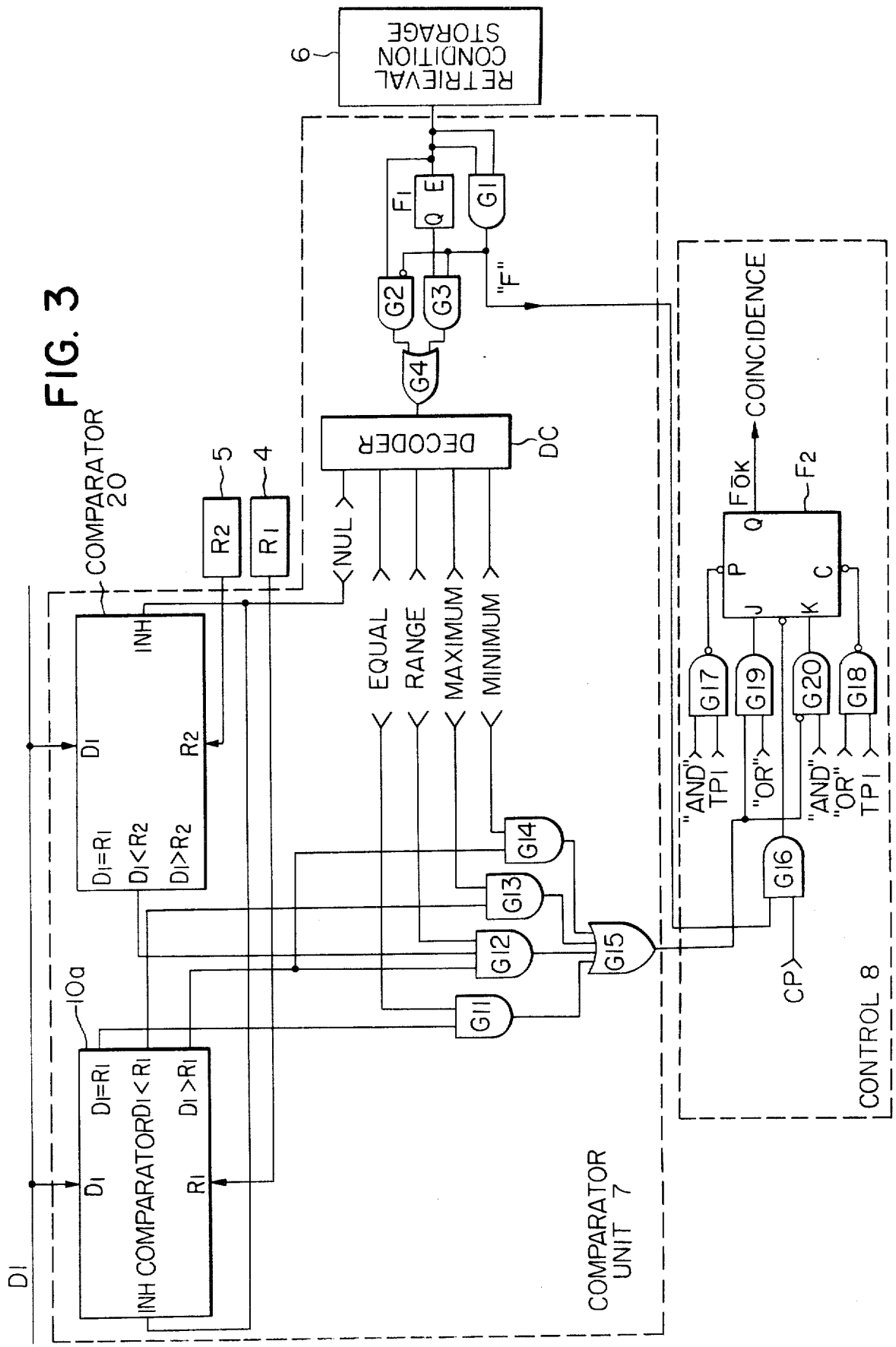
FIG. 3 is a detailed block diagram illustrating major components shown in FIG. 2.

Still referring to FIG. 3, a comparator 10a compares the subject data D1 with the keyword R1 from the memory 4. Depending upon the results of the comparison, the outputs from the comparator 10a may be the EQUAL (D1=R1), LESS THAN (D1<R1) and GREATER THAN (D1>R1) outputs. However, when the NULL signal is transmitted from the decoder DC to be applied to an input INH of the comparator 10a, the latter will not execute any comparisons.

In a like manner, a second comparator 20 performs the comparisons between the subject data and the keywords from the memory 5 and gives the EQUAL, LESS THAN and GREATER THAN outputs depending upon the cases, D1=R2, D1<R2 and D1>R2.

The EQUAL output from the first comparator 10a and the EQUAL signal from the decoder DC are applied to AND gate G11. The GREATER THAN output from the first comparator 10a, the LESS THAN output from the second comparator 20 and the RANGE signal are applied to AND gate G12. Therefore the output is derived from AND gate G12 if and only if R1<D1<R2. The LESS THAN output from the first comparator 10a and the MAXIMUM signal from the decoder DC are applied to AND gate G13. The GREATER THAN output from the first comparator 10a and the MINIMUM signal from the decoder DC are applied to AND gate G14. The outputs from these AND gates G11-G14 are applied to OR gate G15, the output from OR gate G15 being applied to the control 8.

In the control 8, AND gate G16 receives the F code and clock pulses CP so that the AND gate G16 generates one pulse output upon termination of one item. Upon completion of the processing of one record, a flip-flop F2 gives the output FOK. If the output FOK is "1", it means that the one record has met all of the retrieval conditions, and if the output FOK is "0", it means that the record has failed to meet some of the retrieving conditions. When NAND gate G17 receives the AND instruction representing the logical product of retrieval conditions, the gate G17 passes one 1-bit pulse TP1 to the flip-flop F2 so as to set it. When NAND gate 18 receives the OR instruction representative of the logical sum of retrieving conditions, the gate G18 passes one 1-bit pulse TP1 to the flip-flop F2 so as to clear it. AND gate 19 receives the OR instruction and the output from the OR gate G15, the output from the gate G19 sets the flip-flop F2. AND gate G20 receives the AND instruction and the output from the OR gate G15. The output from the gate G20 sets the flip-flop F2.

Therefore the flip-flop F2 is set to generate the output signal FOK=1 in response to the A instruction, but is reset whenever the subject data D1 fails to meet any of the retrieving conditions. That is, the flip-flop F2 remains set as far as the subject data D1 meets the retrieving conditions. However, in response to the OR instruction, the flip-flop F2 remains reset. When the subject data meets some retrieving condition, the flip-flop F2 is set and the data retrieval processing is completed. In other words, in the OR mode when one item in the subject data meets any of the retrieving conditions, the flip-flop F2 is set and the processing is suspended.

For example, assume that the subject data must meet all of the retrieving conditions in the first, second, fourth and fifth items. Then, an operator gives the AND instruction to the control 8. If and only if the subject data have met all of the retrieval conditions in the above items, this data is retrieved. On the other hand, the OR instruction means that the subject data which has met any of the retrieving conditions for instance in the first, second, fourth and fifth items may be retrieved. Thus the data retrieval or searching system in accordance with the present invention permits any combinations of the retrieval conditions.

Next referring to FIGS. 4 and 5 the mode of operation of the data searching system in accordance with the present invention will be described in more detail. Assume that the subject data D1 consisting of the items A, B, C, D, E and so on be stored in the external storage 1. One record consists of the first item representing an article, the second item representing the price of the article, the third item representing an article, the fourth item representing a clerk responsible for this article, the fifth item representing an amount stocked or stored and so on, which are derived from the external storage or memory 1 in the order named. After the first record A has been read out, the next record B is read out and so on.

The retrieving or tallying conditions are shown in FIG. 5. Assume that the retrieving or tally conditions are the television set (the first item in the record A), the price greater than ¥100,000 but less than ¥150,000 (the second item), the clerk in charge "02" (the fourth item) and the stock amount less than 150 (the fifth item).

Referring back to FIG. 2, these data retrieving conditions are entered from the keyboard 11. The first item or article is entered by a depression of a key K1. In a like manner, the second item or price, the third item or article code, the fourth item or clerk and the fifth or stock amount item are entered in response to depressions of keys K2, K3, K4 and K5, respectively. The EQUAL, MINIMUM and MAXIMUM conditions are set with keys K6, K7 and K8, respectively. The RANGE condition is set with a key K9. Various data may be entered from data keys K10; the START signal is set by a key K11; and the AND and OR instructions are entered by depressions of keys K12 and K13, respectively.

Still referring to FIG. 2, under the above retrieving conditions the operator first depresses the key 1 and enters the TELEVISION SET with the data keys K10. Then the microprocessor 10 causes the first item TELEVISION SET to be transferred to the first item memory location in the memory 4. In a like manner, when the operator depresses the EQUAL key K6, the EQUAL condition is set into the first item in the memory 6, and the F code is automatically stored at the end of the EQUAL code by the central processor unit CPU 10, capable of discriminating the length of each item. When the operator depresses the PRICE key K2 and enters "100,000 ⌴ 150,000" from the data keys K10. Then the central processor unit CPU 10 stores "100,000" in the memory 4 and "150,000" in the memory 5. Thereafter the operator depresses the RANGE key K9, the RANGE code being entered in the second item location in the memory 6. The F code is stored following the RANGE code in the manner described above. When the operator depresses the key K4 and enters "02" (the clerk item) from the data keys K10, a number "02" is stored in the fourth item location in the memory 4. Upon depression of the EQUAL key K6, the EQUAL code is stored in the fourth item location in the memory 6 and the F code is also stored at the end of this code in the manner described above. Next the operator depresses the stock or AMOUNT key K5 and enters "150" from the data keys K10 so that a number "150" is stored in the fifth item location in the memory 4. Upon depression of the MAXIMUM key K8, the MAXIMUM code succeeded by the F code is stored in the fifth item location in the memory 6.

Therefore the keywords R1 and R2 are stored in the memories 4 and 5, and the retrieving conditions such as the EQUAL code for selecting the first or article item, the RANGE code for selecting the second or price item, the EQUAL instruction code for selecting the clerk in charge "02" and the MAXIMUM code for selecting the fifth or stock amount item are stored in the memory 6. Finally, the operator depresses the AND key K12 so that the AND instruction code is applied to the control 8.

When these data are processed, a record in the subject data D1 which will meet the above retrieving conditions is stored in the buffer memory 3.

Upon depression of the START key K11, the system operation is started. The subject data in the external memory 1 is read out through the interface circuit 2 and placed in the comparator unit 7 and the buffer memory 3. When the first or article item of the record A, the keywords from the memories 4 and 5 and the retrieval condition code from the memory 6 are applied in synchronism with each other to the comparator unit 7.

Referring further to FIG. 3, the subject data D1 is applied to both the first and second comparators 10a and 20 while the output from the memory 4 is applied to the first comparator 10a and the output from the second memory 5 is applied to the second comparator 20. Since the first or article item of the record A from the external storage 1 coincides with the keyword R1 TELEVISION SET from the memory 4; that is, D1=R1 and since the EQUAL signal or output is derived from the decoder DC in response to the EQUAL code from the storage 6, the coincidence signal from AND gate G11 is transmitted through OR gate G15 to AND gates G19 and G20 to the control 8. Since the AND instruction code is applied to the control 8, the flip-flop F2 is set from the start of the data retrieving process. Since the first items from the external storage 1 and the memory 4 are equal, the flip-flop F2 remains set.

In the second step, the subject data D1 changes to the second or price item "143,000", the first keyword R1 changes to "100,000", the second keyword R2 changes to "150,000"; and the RANGE signal from the decoder DC is applied to AND gate G12.

Since D1>R1 or "143,000">"100,000" in the first comparator 10a, the latter generates the GREATER THAN output which is applied to AND gate G12. In the second comparator 20, D1<R2 or "143,000"<"150,000", the "LESS THAN" output is derived and applied also to AND gate G12. Thus AND gate G12 is enabled, and the output from the gate G12 is applied through OR gate G15 to the gates G19 and G20. Since the second item or "143,000" meets the retrieving conditions that the price must be GREATER THAN ¥100,000 but LESS THAN ¥150,000, the flip-flop F2 remains unchanged.

In the third step, D1 changes to the 3rd item, but the third item in the memory 6 is the NULL code so that the comparison in both the first and second comparators 10a and 20 are inhibited in the manner described elsewhere. As a result, no output is derived from the comparator unit 7 so that the flip-flop F2 in the control 8 remains set.

In the fourth step, the subject data D1 changes to the fourth or clerk item or "01", the first keyword R1 changes to "02" and the EQUAL signal from the decoder 6 is applied to AND gate G11. Since D1≠R1 or "01" is not equal to "02", the first comparator 10a gives no output to AND gate G11 so that no output is transmitted to the control 8 or AND gate G20. Consequently, in response to the output from AND gate 20 which is now enabled, the flip-flop F2 is reset. Once the flip-flop F2 is reset from its set state, the data retrieving process is suspended. Therefore at the end of the processing of the record A, the flip-flop F2 is in the reset state so that the output FOK is "0".

After the first record A having been processed in the manner describe above, the second record B is processed in a manner substantially similar to that described above. First D1=RADIO SET is compared with the keyword R1=TELEVISION SET. Since R1≠D1, the first comparator 10a gives no output to AND gate G11 so that no output from the gate G11 is applied to the gate G20 in the control 8. As a result, the flip-flop F2 is reset. It should be noted that as described elsewhere the flip-flop F2 is always once set when the processing of each record is started in response to the first bit in this record.

Since the flip-flop F2 is reset, the processing of the record B is suspended, and the processing of the third record C is initiated after the flip-flop F4 is set. As with the first record A, the first or article item and the second or price item of the third record C coincide with the retrieval conditions. Furthermore, the fourth or clerk item coincides with the keyword R1 "02" so that the flip-flop F2 still remains set at the end of the fourth item. In the fifth step, D1 is "123" and R1 is "150" so that the first comparator 10a gives the "LESS THAN" output to AND gate 13 to which is also applied the MAXIMUM signal from the decoder 6 in response to the fifth item in the memory 6. Therefore the gate G13 is enabled and the output therefrom is transmitted through OR gate G15 to the gate G20 in the control 8. Since the gate G20 is disabled, the flip-flop F2 still remains in the set state when the processing of the third record C has been completed. Therefore the output FOK is "1" which means that the record C meets the retrieving conditions set.

The record C has been stored in the buffer memory 3 so that the record C may be displayed on or printed out from the output unit 12 (See FIG. 2). Thereafter the processing of the succeeding records D, E and so on is carried out in a manner substantially similar to that described above, but they do not satisfy the retrieving conditions so that no data is retrieved.

It is apparent to those skilled in the art that in addition to the example described above, various retrieving conditions M1 may be obtained by the relational operator keys K6–K13 except K11 key on the keyboard 11 (See FIG. 2).

In summary, the present invention is characterized in that a real time processing of a plurality of keywords may be accomplished, whether or not the flip-flop F2 is set can be monitored everytime when one record has been processed so that the logical combinations of the keywords may be obtained, the information retrieval may be accomplished within a short time period, unlimited information may be retrieved, and free and real time information retrieval may be accomplished with arbitrarily selected keywords.

What we claim is:

1. A data retrieval system comprising:

keyboard means including first keys for designating retrieval conditions under which data is retrieved and for producing retrieval condition signals representative of the retrieval conditions, and second keys for entering keywords, said first keys comprising an EQUAL KEY for causing retrieval to be made of data which is identical with an associated keyword entered, a MINIMUM key for causing retrieval to be made of data which is greater than an associated keyword entered, a MAXIMUM key for causing retrieval to be made of data which is less than an associated keyword entered, and a RANGE key for causing retrieval to be made of data which falls under a range specified by a pair of associated keywords entered;

a retrieval condition memory for storing therein the retrieval condition signals;

first and second keyword memories for storing therein keywords entered, said first keyword memory storing the keywords associated with operation of the EQUAL, MINIMUM and MAXIMUM keys and each of said first and second keyword memories storing the pair of keywords associated with the RANGE key;

a retrieval data memory for storing therein data to be retrieved; and comparator means including first and second comparators responsive to the keywords stored in said first and second keyword memories, respectively, for comparing the data stored in said retrieval data memory with the keywords to produce output signals, a decoder for decoding the retrieval condition signals stored in said retrieval condition memory to produce a decoded signal, and gating means responsive to the output signals and the decoded signal for producing a logical output signal indicative of whether the data to be retrieved satisfies the retrieval conditions.

2. A data retrieval system in accordance with claim 1, wherein said data to be retrieved comprises a name, price and stock amount of articles, said keywords comprising a name and price of articles for control of goods in stock.

* * * * *